United States Patent
Speith-Herfurth et al.

[11] Patent Number: 5,945,225
[45] Date of Patent: Aug. 31, 1999

[54] ORIENTED MULTILAYER POLYOLEFIN FILM WHICH IS HEAT-SEALABLE ON BOTH SIDES, ITS USE, AND PROCESS FOR ITS PRODUCTION

[75] Inventors: Angela Speith-Herfurth, Egelsbach; Wolfgang Rasp, Homburg; Robert Hansohn, Kirkel, all of Germany

[73] Assignee: Hoechst Trespaphan GmbH, Neunkirchen, Germany

[21] Appl. No.: 08/992,433

[22] Filed: Dec. 18, 1997

[30] Foreign Application Priority Data

Dec. 18, 1996 [DE] Germany .......................... 196 52 734

[51] Int. Cl.⁶ .............................. B32B 27/08; B32B 7/12
[52] U.S. Cl. .......................... 428/516; 428/347; 428/349; 428/446; 428/447; 428/910
[58] Field of Search ..................... 428/347, 349, 428/446, 447, 516, 910; 156/244.16

[56] References Cited

U.S. PATENT DOCUMENTS

| | | | |
|---|---|---|---|
| 4,419,411 | 12/1983 | Park . | |
| 4,590,125 | 5/1986 | Balloni et al. | 428/349 |
| 4,692,379 | 9/1987 | Keung et al. . | |
| 4,734,317 | 3/1988 | Bothe et al. . | |
| 4,911,976 | 3/1990 | Park et al. . | |
| 5,089,319 | 2/1992 | Bothe | 428/216 |
| 5,618,618 | 4/1997 | Murschall et al. | 428/331 |
| 5,773,142 | 6/1998 | Murschall et al. | 428/349 |

FOREIGN PATENT DOCUMENTS

| | | |
|---|---|---|
| 143130 | 12/1983 | European Pat. Off. . |
| 182463 | 9/1985 | European Pat. Off. . |
| 194588 | 3/1986 | European Pat. Off. . |
| 217598 | 9/1986 | European Pat. Off. . |

*Primary Examiner*—Daniel Zirker
*Attorney, Agent, or Firm*—Foley & Lardner

[57] ABSTRACT

Oriented multilayer polyolefin film which is heat-sealable on both sides, its use, and process for its production.

An oriented multilayer polyolefin film which is heat-sealable on both sides and is printable, made from at least one base layer and, on both sides, heat-sealable outer layers, which film contains a hydrocarbon resin. Both outer layers contain silicone oil and at least one surface of the film is surface-treated.

13 Claims, No Drawings

ORIENTED MULTILAYER POLYOLEFIN FILM WHICH IS HEAT-SEALABLE ON BOTH SIDES, ITS USE, AND PROCESS FOR ITS PRODUCTION

The invention relates to an oriented multilayer polyolefin film including a base layer which essentially comprises polypropylene and heat-sealable outer layers on both sides. The films are distinguished by a low coefficient of friction combined with exceptional heat-sealability on both sides of the film and superior printability.

Films having a low coefficient of friction are described in the prior art. Over a number of years, the requirements for ease of processing of the films and for their ability to run on automatic machines have been constantly increasing. For this reason, the demand is for ever lower coefficients of friction, where the term "low" includes coefficients of friction of orders of magnitude from 0.3 to 0.1; in contrast, several years ago a coefficient of friction from 0.4 to 0.5 was without doubt regarded as exceptionally low.

It is known from the prior art that a carboxamide can be added to polyolefin films to improve their surface-slip properties. The films described contain amides in their outer layers or in their base layer and outer layers.

The prior art moreover describes the addition of silicone oil as an excellent lubricant for achievement of coefficients of friction of less than 0.3 in polyolefin films. Some texts recommend the use of the silicone oil in combination with other lubricants.

EP-A-0 182 463 describes a multilayer film which contains from 0.05 to 0.2% by weight of tertiary aliphatic amine in the base layer and a combination of silicone oil and $SiO_2$ in the heat-sealable outer layer. According to the description, the surprising combined effect of $SiO_2$, silicone oil and amine in combination with an outer layer thickness of less than 0.8 $\mu$m gives films having coefficients of friction of 0.3 and below. Despite this superior coefficient of friction, the processing properties of the film are unsatisfactory. In particular, it is not printable and is therefore unsuitable for many applications.

EP-A-0 143 130 discloses films which contain a carboxamide in the base layer and likewise the combination of silicone oil and $SiO_2$ in the outer layer. As in the abovementioned EP-A-0 182 463, a synergistic effect is described of the three selected components on the coefficient of friction. These films, too, are unsatisfactory in processing despite their advantageous surface-slip, and they too lack the important property of printability.

EP-A-0 194 588 and EP-A-0 217 598 describe a more advanced film which, despite good surface-slip properties as a result of silicone oil addition, has good printability. In these films, silicone oil, if desired in combination with $SiO_2$, is incorporated only into one outer layer. The second outer layer, which contains no silicone oil, is corona-treated to improve its printability. Subsequently, there is transfer of silicone oil onto the surface of this treated second outer layer as a result of contact with the first outer layer, which contains silicone oil. This technique gives a film which contains silicone oil, has good surface-slip properties, and at the same time has good printability on the corona-treated side and is still heat-sealable. This film has the disadvantage that it is printable only on one side. This is particularly disadvantageous for the use of the film in the packaging sector, in particular where there is a need for a film which is printable on both sides and has good surface-slip properties.

The abovementioned process has until now been the only known possibility for also using the advantageous effect of the silicone oil in cases where a heat-sealable outer layer has been surface-treated. Those skilled in the art have hitherto been convinced that it is not possible to corona-treat an outer layer containing silicone oil, since this surface treatment causes crosslinking of the silicone oil and thus destroys the heat-sealability of the initially heat-sealable outer layer.

It is therefore an object of the present invention to provide a multilayer polypropylene film which has a low coefficient of friction and is printable and heat-sealable on both sides.

According to the invention, this object is achieved by means of a film of the type described at the outset, wherein the film contains a hydrocarbon resin and both outer layers contain silicone oil, and at least one surface of the film is surface-treated.

It has been found that the undesirable interaction which occurs between the silicone oil and the corona treatment, and which destroys the heat-sealability, can be prevented by adding the hydrocarbon resin to the base layer. Surprisingly, this makes it possible to carry out the surface treatment of a heat-sealable film which contains silicone oil in its heat-sealable outer layer.

For the purposes of the present invention, "surface treatment" includes any process which is suitable for improving the surface tension of the film surface and/or the adhesion of the film surfaces with respect to printing inks, coatings, laminates, etc. Preferred surface-treatment methods are corona treatment and flame treatment.

For the purposes of the present invention, "silicone oils" include silicone oils having a viscosity in the range from 350 to 500,000 centistokes, for example polydialkylsiloxanes with $C_1$–$C_4$-alkyl radicals, polyalkylphenylsiloxanes, polyether-modified silicone oils and olefin-modified silicone oils. Among these, polydimethylsiloxanes are particularly preferred. The outer layers generally contain from 0.1 to 2% by weight of silicone oil, preferably from 0.3 to 1.0% by weight in each case based on the weight of the layer.

For the purposes of the present invention, "base layer" is the layer which makes up at least 50%, preferably from 80 to 90%, of the total film thickness.

For the purposes of the present invention, "outer layers" are the outermost layers of the film.

For the purposes of the present invention, "hydrocarbon resins" are low-molecular-weight polymers whose mean molecular weight (weight average Mw) is generally in a range from 300 to 8000 and which are different from the polypropylenes.

The base layer of the novel multilayer film comprises essentially a polyolefin, preferably a propylene polymer, and a hydrocarbon resin and, if desired, effective amounts of other additives. The base layer generally comprises at least 50% by weight, preferably from 75 to 98% by weight, in particular from 90 to 98% by weight, of the propylene polymer (based in each case on the weight of the base layer).

The polypropylene comprises at least from 90 to 100% by weight, preferably from 98 to 100% by weight, of propylene and has a melting point of at least 140° C., preferably from 150 to 170° C. Preferred propylene polymers for the base layer are isotactic homopolypropylene having an n-heptane-soluble proportion of not more than 6% by weight, based on the isotactic homopolypropylene, copolymers of ethylene and propylene having an ethylene content of not more than 5% by weight, copolymers of propylene and $C_4$–$C_8$-olefins having not more than 5% by weight content of these olefins, isotactic polypropylene being particularly preferred. The propylene polymer of the base layer generally has a melt flow index of from 0.5 to 10 g/10 min, preferably from 1.5 to 4 g/10 min, at 230° C. and 21.6 N load (DIN 53 735). The percentages by weight are based on the respective copolymer.

According to the invention, the base layer contains a hydrocarbon resin in an amount of from 2 to 20% by weight, preferably from 3 to less than 10% by weight, more preferably 3 to 9% by weight, based on the layer. Hydrocarbon resins are low-molecular-weight polymers whose mean molecular weight (weight-average Mw) is generally in a range from 300 to 8000, preferably from 400 to 5000, particularly preferably from 500 to 2000. The mean molecular weight of the resins is thus markedly lower than that of the propylene polymers which form the main component of the base layer and generally have a mean molecular weight of greater than 100,000.

Suitable low-molecular-weight resins are naturally occurring or synthetic resins having a softening point, determined according to ASTM E-28, of from 60 to 180° C., preferably from 80 to 150° C. Among the numerous low-molecular-weight resins, preference is given to the hydrocarbon resins and particularly to petroleum resins, styrene resins, cyclopentadiene resins and terpene resins; (these resins are described in Ullmanns Encykiopädie der technischen Chemie [Ullmann's Encyclopedia of Industrial Chemistry], 4th edition, Vol. 12, pp. 525–555). Suitable petroleum resins are described in numerous texts, such as EP-A-0 180 087, which is expressly incorporated herein by way of reference.

The petroleum resins are hydrocarbon resins prepared by polymerizing deep-decomposed petroleum materials in the presence of a catalyst. These petroleum materials usually comprise a mixture of resin-forming substances, such as styrene, methylstyrene, vinyltoluene, indene, methylindene, butadiene, isoprene, piperylene and pentylene. The styrene resins are low-molecular-weight homopolymers of styrene or copolymers of styrene and other monomers, such as methylstyrene, vinyltoluene and butadiene. The cyclopentadiene resins are cyclopentadiene homopolymers or cyclopentadiene copolymers, which are obtained from coal tar distillates and fractionated petroleum gas. These resins are prepared by holding the materials containing cyclopentadiene at high temperature for a long time. Depending on the reaction temperature, dimers, trimers or oligomers can be obtained.

The terpene resins are polymers of terpenes, i.e. hydrocarbons of the formula $C_{10}H_{16}$, which are present in almost all essential oils and in oil-containing resins from plants; phenol-modified terpene resins are included. Specific examples of terpenes are pinene, a-pinene, dipentene, limonene, myrcene, camphene and similar terpenes. The hydrocarbon resins may also be those known as modified hydrocarbon resins. The modification is generally carried out by reacting the raw materials, before the polymerization or by introducing specific monomers or by reacting the polymerized product, in particular by hydrogenating or partially hydrogenating.

Other hydrocarbon resins used are styrene homopolymers, styrene copolymers, cyclopentadiene homopolymers, cyclopentadiene copolymers and/or terpene polymers having a softening point above 135° C. (the hydrogenated product being preferred in the case of unsaturated polymers). Very particular preference is given to using, in the intermediate layers, cyclopentadiene polymers having a softening point of 140° C. and above.

In general the base layer of the polyolefin film has an E-Modulus of less than 3000 N/mm², preferably 1800–2800 N/mm² in both directions. This is because in general no specific mechanical properties or twist wrap properties are required for sealable packaging films.

The novel polyolefin film also includes at least one heat-sealable outer layer preferably two heat sealable outer layers. This outer layers comprise eventually heat-sealable polymers of α-olefins having from 2 to 10 carbon atoms and silicone oil, and, if desired, effective amounts of other additives. The outer layer/s generally comprise from 75 to virtually 100% by weight, in particular from 90 to 99.5% by weight, of the heat-sealable α-olefinic polymer.

Examples of heat-sealable α-olefinic polymers of this type are a copolymer of ethylene and propylene or ethylene and 1-butylene or propylene and 1-butylene or a terpolymer of ethylene and propylene and 1-butylene or a mixture of two or more of the homo-, co- and terpolymers mentioned or a blend of two or more of the homo-, co- and terpolymers mentioned, if desired mixed with one or more of the homo-, co- and terpolymers mentioned, where particular preference is given to random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, based in each case on the total weight of the copolymer or random ethylene-propylene-1-butylene terpolymers having an ethylene content of from 1 to 10% by weight, preferably from 2 to 6% by weight, and a 1-butylene content of from 2 to 20% by weight, preferably from 4 to 20% by weight, based in each case on the total weight of the terpolymers, or a blend of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, based in each case on the total weight of the polymer blend.

The co- and terpolymers described above generally have a melt flow index of from 1.5 to 30 g/10 min, preferably from 3 to 15 g/10 min, and a melting point in the range from 120 to 140° C. The blend of co- and terpolymers which is described above generally has a melt flow index of from 5 to 9 g/10 min and a melting point of from 120 to 150° C. All of the melt flow indices given above are measured at 230° C. and with a load of 21.6 N (DIN 53 735).

If desired, all of the outer layer polymers described above may be peroxidically degraded in the manner described above for the base layer, using fundamentally the same peroxides. The degradation factor for the outer layer polymers is generally in the range from 3 to 15, preferably from 6 to 10.

The novel multilayer film includes at least the base layer described above and, on both sides, heat-sealable outer layers which comprise the heat-sealable propylene polymers described above or mixtures of these. Depending on its intended application, the multilayer film may have one or more intermediate layers on the surface of the base layer. In a preferred embodiment, the multilayer film has three layers and it is not essential for the formulations of the outer layers to be identical, although they may be so.

The thickness of the outer layer(s) is greater than 0.4 μm and is preferably in the range from 0.6 to 4 μm, in particular from 0.8 to 2 μm, and where outer layers are present on both sides, these may have the same or different thicknesses.

The total thickness of the novel multilayer polyolefin film can vary within wide limits and depends on its intended use. It is preferably from 5 to 70 μm, in particular from 10 to 50 μm, the base layer making up from about 50 to 90% of the total film thickness.

As described above, the base layer and the outer layers may also contain effective amounts of other customary additives, preferably stabilizers, neutralizing agents, antistats and antiblocking agents.

The stabilizers used may be the customary stabilizing compounds for polymers of ethylene, propylene and other a-olefins. They are added in amounts of from 0.05 to 2% by weight. Phenolic stabilizers, alkali metal/alkaline earth metal stearates and/or alkali metal/alkaline earth metal carbonates are particularly suitable. Phenolic stabilizers are added in amounts of from 0.1 to 0.6% by weight, in particular from 0.15 to 0.3% by weight, and preferably have a molar mass of more than 500 g/mol. Pentaerythritol tetrakis-3-(3,5-di-tert-butyl-4-hydroxyphenyl)propionate and 1,3,5-trimethyl-2,4,6-tris(3,5-di-tert-butyl-4-hydroxybenzyl)benzene are particularly advantageous.

Preferred neutralizing agents are dihydrotalcite, calcium stearate and/or calcium carbonate of average particle size not more than 0.7 μm, and absolute particle size less than 10 μm and a specific surface area of not less than 40 m²/g. The neutralizing agent is generally used in an amount of from 0.02 to 0.1% by weight.

Preferred antistats are alkali metal alkanesulfonates and/or essentially straight-chain and saturated aliphatic tertiary amines. Tertiary aliphatic amines include compounds of the formula $R_3N$, where R is a fatty acid radical or a $C_{12}$–$C_{18}$-alkyl radical or a hydroxy-substituted alkyl radical, where the radicals R may be identical or different. Preferred hydroxy-substituted alkyl radicals are hydroxyethyl, hydroxypropyl and hydroxybutyl radicals. N,N-bis(2-hydroxyethyl)alkylamines are particularly preferred. It is particularly useful to use the tertiary aliphatic amines in an amount of from 0.05 to 1.0% by weight, from 0.1 to 0.3% by weight being especially advantageous. Another suitable antistat is glycerol monostearate.

Carboxamides include amides of water-soluble carboxylic acids having from 8 to 24 carbon atoms, or mixtures of these amides, erucamide, oleamide, stearamide and the like being particularly preferred. It has also proven particularly advantageous to incorporate the amide only into the base layer of the multilayer film, preferably in an amount of from 0.1 to 0.3% by weight; an amount of from 0.15 to 0.25% by weight (based on the base layer) is particularly useful.

The invention also provides a process for producing the novel multilayer film by the coextrusion process known per se.

This process is carried out by coextruding the melts corresponding to the individual layers of the film through a flat film die, solidifying the film by drawing it off on one or more rolls and then biaxially stretching (orienting) the film, heat-setting the biaxially stretched film and surface treated, preferably corona- or flame-treating it on the surface layer intended for treatment.

The biaxial stretching (orientation) may be carried out simultaneously or in sequence, preference being given to biaxial stretching in sequence, in which stretching is firstly carried out longitudinally (in the machine direction) and then transversely (perpendicularly to the machine direction).

As is usual in coextrusion, the polymer or polymer mixture of the individual layers is firstly compressed and plasticized in an extruder, and the additives which may, if desired, be added may already be present in the polymer or polymer mixture at this stage. The melts are then simultaneously extruded through a flat film die, and the extruded multilayer film is drawn off on one or more take-off rolls, and thus cools and solidifies. It has proven particularly useful if the temperature of the roll(s) which cool(s) and solidify/solidifies the extruded film is maintained at from 50 to 110° C.

The resultant film is then stretched longitudinally and transversely to the direction of extrusion, thus orienting the molecular chains. The stretching ratio in the longitudinal direction is preferably from 4:1 to 7:1, and in the transverse direction preferably from 8:1 to 10:1. The longitudinal stretching may expediently be carried out with the aid of two rolls running at different speeds corresponding to the desired stretching ratio, and the transverse stretching with the aid of an appropriate tenter frame.

The temperatures at which longitudinal and transverse stretching are carried out may vary. In general, the longitudinal stretching is preferably carried out at from 120 to 150° C., and the transverse stretching preferably at from 155 to 190° C.

The biaxial stretching of the film is followed by heat-setting (heat treatment), the film being kept at a temperature of from 140 to 160° C. for from about 0.5 to 10 s. The film is then reeled using a reeling system in the usual manner.

As already mentioned at the outset, the film may, after the biaxial stretching, be preferably corona- or flame-treated on at least one surface by one of the known methods.

For corona treatment, it is advantageous to proceed by passing the film between two conductors serving as electrodes; sufficient voltage is applied between the electrodes, usually an alternating voltage (from about 10 to 20 kV and from 20 to 40 kHz), to permit corona discharge. The corona discharge ionizes the air above the film surface, and this reacts with the molecules of the film surface, giving rise to polar inclusions in the essentially non-polar polymer matrix.

For flame treatment using a polarized flame (cf. U.S. Pat. No. 4,622,237), a steady voltage is applied between a burner (negative pole) and a cooling roll. The magnitude of voltage applied is from 500 to 3000 V, preferably from 1500 to 2000 V. The applied voltage increases the acceleration of the ionized atoms, and these impact with higher kinetic energy on the polymer surface. The chemical bonds within the polymer molecule are more easily parted and free-radical formation proceeds more rapidly. The exposure of the polymer to high temperature here is much lower than in standard flame treatment, and it is possible to obtain films in which the heat-sealing properties of the treated side are even better than those of the untreated side.

The invention will now be described in greater detail using working examples.

EXAMPLE 1

A three-layer film having a total thickness of 20 μm and a layer construction ABA, i.e. the base layer was surrounded by two identical outer layers A, was produced by coextrusion followed by stepwise orientation in longitudinal and transverse directions. Each of the outer layers had a thickness of 0.7 μm. Before reeling, the film was subjected to corona treatment on one side. The surface tension of the film after this treatment was about 36 mN/m on the treated side.

All of the layers contained 0.13% by weight of pentaerythritol tetrakis4-(3,5-di-tert-butyl-4-hydroxyphenyl) propionate (®Irganox 1010) as stabilizer and 0.06% by weight of calcium stearate as neutralizing agent.

The base layer B consisted essentially of a polypropylene homopolymer having an n-heptane-soluble proportion of 4% by weight and a melting point of from 160 to 162° C. The melt flow index of the polypropylene homopolymer was 3.2 g/10 min at 230° C. and 21.6 N load (DIN 53 735). The base layer contained 10% by weight, based on the weight of the base layer, of a hydrocarbon resin having a melting point of about 140° C. (obtainable from Exxon Chemicals, Germany as resin masterbatch Exxelor PA 609).

The heat-sealable outer polyolefin layers consisted essentially of an ethylene-propylene-1-butylene terpolymer having a content of 3% by weight of ethylene, 88.5% by weight of propylene and 8% by weight of 1 -butylene.

The outer layers contained 0.33% by weight of a silica having an average particle diameter of 4 μm or 2 μm and 0.8% by weight of a polydimethylsiloxane having a viscosity of 30,000 centistokes.

The detailed conditions for film production were:

| Extrusion: | extrusion temperature 260° C. |
|---|---|
| Longitudinal stretching: | stretching roll T = 135° C. longitudinal stretching by a factor of 6 |
| Transverse stretching: | heating sections T = 180° C. stretching sections T = 177° C. transverse stretching by a factor of 8 |
| Setting: | temperature T = 155° C. |
| Corona treatment: | voltage: 10,000 V frequency: 10,000 Hz |

The resultant film had a surface tension (ink method) of 36 mN/m on the corona-treated surface. The two pretreated heat-sealable layers were heat-sealed with respect to one another at a temperature of 130° C. (sealing time 0.5 sec and pressure 10 N/mm$^2$). The seal seam strength was 1.1 N/1 5mm. At a temperature of 140° C. (sealing time 0,15 sec and pressure 0,35 N/cm$^2$) the seal seam strength was 1,2 N/15 mm.

Comparative Example 1

A film was produced according to Example 1. The only difference was that the base layer did not contain any resin. The results are summerized in Table 1.

Comparative Example 2

A film was produced according to Example 1. The only difference was that the corona treated cover layer did not contain any silicon oil. The results are summarized in Table 1.

Comparative Example 3

A film was produced according to Example 1. The only difference was that none of the cover-layers were coroan treated. The results are summarized in Table 1.

The Examples and Comparative Examples demonstrate that resin in the base layer of the film prevents the silicon oil in the cover layer from curing. Thereby the films is still sealable. The use of resins in polypropylene films is known. Also it is known that resin improves the mechanical properties and barriere properties of polypropylene films. But it was totally surprising that resin in the film stops curing of the silicon oil in the cover layer by corona treatment. The invention opens new ways to produce films which are printable due to corona treatment and have at the same time very good coefficient of friction and still at the same time are sealable. Hereto before such a combination of properties could be achieved only by the "transfer process".

The following methods were used to measure raw material and film parameters:

Melt flow index

Measurement of the melt flow index was based on DIN 53 735 at 230° C. with 21.6 N load or at 190° C. with 50 N load.

Melting point

DSC measurement, melting curve maximum, heating rate 20° C./min.

Haze

Measurement of the haze of the film was based on ASTM-D 1003-52.

Gloss

Gloss was determined according to DIN 67 530. The reflectance was measured, as a optical value which defines the surface of a film. Based on the standards ASTM-D 523-78 and ISO 2813, the angle of incidence was set at 60° or 85°. A beam of light hits the flat test surface at the set angle of incidence and is reflected and/or scattered thereby. A proportional electrical variable is displayed, representing the scattered thereby. A proportional electrical variable is displayed, representing the light beams hitting the photo-electric detector. The value measured is dimensionless and is stated together with the angle of incidence.

Seal seam strength

This was determined by laying two strips of film of width 15 mm on top of one another and sealing them at 130° C., or 140° C., with a sealing time of 0.5 s or 0.15 s and a sealing pressure of 10 N/mm$^2$ 0.35 N/cm$^2$ (equipment: Brugger NDS, sealing jaws heated on one side). The seal seam strength was determined by the T-peel method.

Coefficient of friction

Measurement of the coefficient of friction was based on DIN 53 375.

Surface tension

Surface tension was determined using the "ink method" (DIN 53 364).

Printability

The corona-treated films were printed, respectively, 14 days (short-term assessment) and 6 months (long-term assessment) after their production. The adhesive tape test was used to assess print adhesion. The print adhesion was assessed as reasonable if little ink could be detached and as poor if a significant amount of ink could be detached.

Determination of the sealing initiation temperature:

Using Brugger HSG/ET heat-sealing equipment, heat-sealed specimens were produced (seal seam 20 mm×100 mm) by sealing a film at various temperatures with the aid of two heated sealing jaws, with a sealing pressure of 10 N/cm$^2$ or 0.35 N/cm$^2$ and a sealing time of 0.5 s or 0.15 s. Test strips of width 15 mm were cut from the sealed specimens. The T-seal seam strength, i.e. the force required to separate the test strips, is determined using a tensile test machine at 200 mm/min separation velocity, the plane of the seal seam forming a right angle with the direction of tension. The sealing initiation temperature (or lowest sealing temperature) is the temperature at which the seal seam strength achieved is at least 0.5 N/15 mm.

TABLE 1

| Example | Composition | Seal at 130° C., 0.5 s and 10 N/cm² | Seal at 130° C., 0.5 s and 10 N/cm² | printability | coefficient of friction |
|---|---|---|---|---|---|
| Ex. 1 | resin and silicon oil in both cover layers | 1.2 N/15 mm | 1.2 N/15 mm | very good | 0.3 |
| comp. ex. 1 | without resin but silicon oil in both cover layers | 0.1 N/15 mm | 0.1 N/15 mm | very good | 0.3 |
| comp. ex. 2 | resin but corona treated cover layer is devoid of silicon oil | 1.3 N/15 mm | 1.3 N/45 mm | very good | 0.7 |
| comp. ex. 3 | resin and silicon oil in both cover layers but no corona treatment | 1,5 N/15 mm | 1.5 N/15 mm | hardly printable | 0.3 |

We claim:

1. An oriented multilayer polyolefin film which is heat-sealable on both sides and is printable, made from at least one base layer and, on both sides, heat-sealable outer layers, wherein the base layer contains a hydrocarbon resin and both outer layers contain silicone oil and at least one surface of the film is surface-treated.

2. A multilayer polyolefin film as claimed in claim 1, comprising a hydrocarbon resin in one or both of the outer layer or layers or an intermediate layer.

3. A multilayer polyolefin film as claimed in claim 1, wherein one or both of the outer layers comprises $SiO_2$ with an average particle diameter of from 2 to 5 μm.

4. A multilayer polyolefin film as claimed in claim 1, wherein the base layer contains from 0.05 to 0.25% by weight based on the base layer of tertiary aliphatic amine.

5. A multilayer polyolefin film as claimed in claim 1, wherein the outer layers contain from 0.2 to 0.5% by weight (based on the respective outer layer) of silicone oil.

6. A multilayer polyolefin film as claimed in claim 1, wherein at least one of the outer layers contain more than 0.1% by weight of antiblocking agents.

7. A multilayer polyolefin film as claimed in claim 1, wherein the film has a coefficient of friction after processing of from 0.2 to 0.3 and a surface tension of >34 mN/m.

8. A multilayer polyolefin film as claimed in claim 7, wherein the processing includes the printing or laminating of the multilayer film.

9. Packaging film comprising a multilayer polyolefin film as claimed in claim 1.

10. A polyolefin film as claimed in claim 1, which has been printed or laminated.

11. A laminate including a multilayer polyolefin film as claimed in claim 1 and a member selected from the group consisting of paper, board, and another thermoplastic film.

12. A multilayer film as claimed in claim 1, wherein the film that is surface-treated comprises corona or flame treatment.

13. A process for producing a multilayer polyolefin film as claimed in claim 1, which comprises coextruding the melts corresponding to the individual layers of the film through a flat film die, drawing off the coextruded film over a take-off roll whose temperature is from 80 to 110° C., stretching the film biaxially with a longitudinal stretching ratio of from 4:1 to 7:1 and a transverse stretching ratio of from 8:1 to 10:1, and heat-setting, surface-treating and then reeling the biaxially stretched film.

* * * * *